United States Patent (10) Patent No.: US 9,436,807 B2
Daniel et al. (45) Date of Patent: Sep. 6, 2016

(54) METHOD AND APPARATUS FOR PROVIDING DIGITAL RIGHTS MANAGEMENT SERVICE IN THE CLOUD

(71) Applicant: Adobe Systems Incorporated, San Jose, CA (US)

(72) Inventors: Aldrin Chella Daniel, Nagarcoil (IN); Praveen Kumar V, Vellore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 626 days.

(21) Appl. No.: 13/934,411

(22) Filed: Jul. 3, 2013

(65) Prior Publication Data

US 2015/0013014 A1 Jan. 8, 2015

(51) Int. Cl.
*G06F 19/00* (2011.01)
*G06F 21/10* (2013.01)

(52) U.S. Cl.
CPC .................................. *G06F 21/10* (2013.01)

(58) Field of Classification Search
CPC ........... G06F 21/10; G06F 1/00; G06F 21/00
USPC ......... 705/901, 50, 80, 1.1, 59; 726/1, 2, 22, 726/24, 26, 34; 709/223
See application file for complete search history.

(56) References Cited

U.S. PATENT DOCUMENTS

| | | | |
|---|---|---|---|
| 8,402,113 B2 * | 3/2013 | Jung | G06F 17/3089 709/217 |
| 8,850,230 B2 * | 9/2014 | Schnell | G06F 21/10 709/206 |
| 9,072,972 B2 * | 7/2015 | Ahiska | 705/59 |
| 9,086,897 B2 * | 7/2015 | Oh | G06F 9/4445 |
| 9,129,095 B1 * | 9/2015 | Lam | G06F 21/6218 |
| 2012/0059926 A1 * | 3/2012 | Jung | G06F 17/30861 709/223 |
| 2013/0013767 A1 * | 1/2013 | Stober | G06F 9/44505 709/224 |
| 2014/0164563 A1 * | 6/2014 | Leekley | H04L 67/1074 709/217 |
| 2014/0172603 A1 * | 6/2014 | Rondan | G06Q 20/123 705/21 |
| 2014/0379594 A1 * | 12/2014 | Alongi | G06Q 30/01 705/318 |
| 2015/0126282 A1 * | 5/2015 | Hitomi | A63F 13/355 3/355 |

* cited by examiner

*Primary Examiner* — McDieunel Marc
(74) *Attorney, Agent, or Firm* — Keller Jolley Preece

(57) ABSTRACT

A computer implemented method and apparatus for providing digital rights management service in the cloud. The method comprises receiving, at a cloud-based server, a request for a digital rights license from a client device, wherein the digital rights license enables accessing of protected digital media content on the client device; determining, by the cloud-based server, an external license server to facilitate processing the request; routing the request to the external license server; receiving, at the cloud-based server, the requested digital rights license from the external license server; and routing, by the cloud-based server, the requested digital rights license to the client device.

20 Claims, 3 Drawing Sheets

METHOD AND APPARATUS FOR PROVIDING DIGITAL RIGHTS MANAGEMENT SERVICE IN THE CLOUD

BACKGROUND OF THE INVENTION

1. Field of the Invention

Embodiments of the present invention generally relate to digital rights management and, more particularly, to a method and apparatus for providing digital rights management service in the cloud.

2. Description of the Related Art

Digital Rights Management (DRM) is an important tool for content providers to enforce licenses or entitlements to control access to digital media on client devices. Digital media is encrypted before it is sent to a client device. When the client device determines that the content is encrypted, a DRM agent on the client device parses metadata that is sent with the digital media. The metadata identifies from where a decryption key may be retrieved, which key is needed to decrypt the digital media. The DRM agent sends a query to a license provider, which in turn returns the key and a set of rules. The rules include a duration of time the license for the content is valid i.e., for how long the digital media is entitled to be accessed (such as viewed). The DRM agent on the client devices enforces the rules received from the content provider.

Currently, the DRM logic resides on the client device. However, the client device may be a computer that executes desktop media playing software, such as ADOBE® Media Player, a gaming system that streams digital media, such as an XBOX®, and the like. Some devices have programming language constraints that require a specific language. Such constraints make the DRM solution less secure. Having the DRM logic on the client device necessitates scaling of the DRM logic to low end consumer electronics video consumption devices. Lastly, a problem is created when there is an update to the DRM logic or when the DRM keys are breached. In such a situation, updates to the DRM component of the client device must be updated on all client devices. Thus, maintaining DRM on the client device results in a substantial use of time and resources for the digital media provider.

Therefore, there is a need for a method and apparatus for providing digital rights management service in the cloud.

SUMMARY OF THE INVENTION

A method and apparatus for providing digital rights management service in the cloud substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
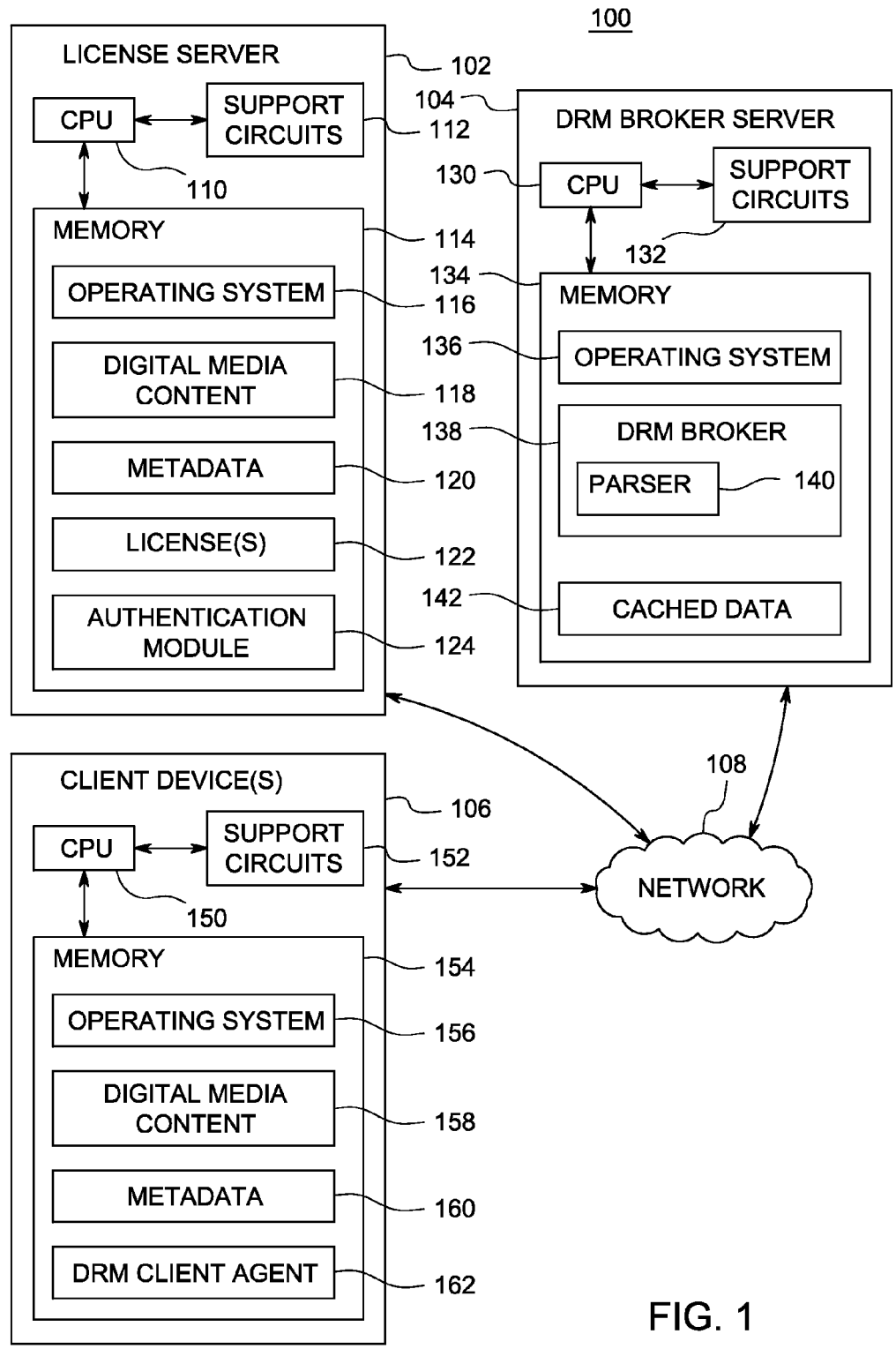
FIG. 1 depicts a block diagram of a system that supports providing digital rights management (DRM) service in the cloud, according to one or more embodiments.

While the method and apparatus is described herein by way of example for several embodiments and illustrative drawings, those skilled in the art will recognize that the method and apparatus for providing digital rights management service in the cloud is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for providing digital rights management service in the cloud defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for providing digital rights management (DRM) service in the cloud. Embodiments of the invention provide a DRM client agent on a client device. When digital media and its associated metadata, protected, for example by encryption, are received on the client device, the DRM client agent queries a DRM broker on a cloud server for a decryption key. The DRM broker serves as a proxy to request the key from a license server on behalf of the DRM client agent. The license server validates that the client device is entitled to view or otherwise access the digital media content and returns the license, which includes the decryption key and rules, to the DRM broker. The DRM broker creates cached data by encrypting the license and license state information pertaining to the execution of the license, for example, a clock time when the license was last requested by the client. If a second request is received from the client device, the DRM broker retrieves the license and license state information from the cached data instead of the license server. The DRM broker then forwards the decryption key, encrypted cached data, and rules to the client device. The decryption key enables viewing of, or other access to, the digital media content. The DRM client agent enforces the rules on the client device.

Advantageously, embodiments of the present invention remove the DRM logic from the client device and put the logic in the cloud, for example, to include as part of ADOBE® CREATIVE CLOUD™, thereby making DRM more scalable and secure. In addition, updates to the DRM may take place without affecting the client device.

Various embodiments of a method and apparatus for providing digital rights management service in the cloud are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 that supports providing digital rights management (DRM) service in the cloud, according to one or more embodiments of the invention. The system 100 includes a license server 102, a DRM broker server 104, and a plurality of client devices 106, communicatively coupled to one another via a network 108.

The license server 102 is a computing device, such as a desktop computer, laptop, tablet computer, and the like. The license server 102 includes a CPU 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like. The memory 114 includes an operating system 116, a plurality of licenses 122, and an authentication module 124. In some embodiments, the license server 102 is also a digital content provider, in which case the license server 102 also includes digital media content 118 and metadata 120 that is associated with the digital media content 118. The license server 102 may be an external third-party license server. The metadata 120 may be contained within digital media content 118 or the metadata 120 may be stored separately.

The DRM broker server 104 is a type of computing device known to one of ordinary skill in the art that is used for providing computing services within the cloud, e.g., a blade server, virtual machine, and the like. Although the embodiments discussed here involve a cloud server, one skilled in the art will appreciate the invention may also be performed using any computing device, such as desktop computers, laptops, tablet computers, and the like. The DRM broker server 104 includes a Central Processing Unit (CPU) 130, support circuits 132, and a memory 134. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like. The memory 134 includes an operating system 136, a DRM broker 138 and cached data 142. The DRM broker 138 includes a parser 140.

The client device 106 may be any computing device, such as a desktop computer, laptop, mobile device, a gaming system that streams digital media, such as an XBOX®, a software application that interacts with media content, such as an ADOBE® Media Player, and the like. The client device 106 includes a CPU 150, support circuits 152, and a memory 154. The CPU 150 may include one or more commercially available microprocessors or microcontrollers that facilitate data processing and storage. The various support circuits 152 facilitate the operation of the CPU 150 and include one or more clock circuits, power supplies, cache, input/output circuits, and the like. The memory 154 includes at least one of Read Only Memory (ROM), Random Access Memory (RAM), disk drive storage, optical storage, removable storage and/or the like. The memory 154 includes an operating system 156, digital media content 158, metadata 160, and a DRM client agent 162.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

A client device 106 requests digital media content 118 from a content provider who, in some embodiments may also serve as the license server 102. The license server 102 sends the digital media content 118 and metadata 120 to the client device 106. In some embodiments, the metadata 160 is embedded within the digital media content 118 and is extracted on the client device 106. The client device 106 stores the digital media content 158 and the metadata 160 and parses the metadata 160 in order to determine whether the digital media content 158 is protected, for example by encryption. If the digital media content 158 is protected, a key, such as a decryption key, is required to view or otherwise access the protected digital media content 158. The DRM client agent 162 sends a query to the DRM broker server 104. The query includes a request for the key and information about the client device 106.

The DRM broker 138 uses a parser 140 to parse the metadata that is received with the query. The metadata identifies the digital media content and also identifies where to send a request for a license for the digital content. The license contains the key. The DRM broker 138 sends the request for a license to the license server 102 identified in the metadata 160. The DRM broker server 104 acts as a proxy between the client device 106 and license server 102. After the authentication module 124, determines that the client device 106 is authorized to view or otherwise access the digital media content 158, the license server 102, returns the license to the DRM broker server 104, which license includes the key and rules associated with the digital media content 158. The rules may include entitlement information such as for how long the digital media content 158 may be viewed and the like. The DRM broker 138 creates the cached data 142 by encrypting the license and license state information, and sends the encrypted information with the key response. If a subsequent request is received from the client device 106, the request includes the cached data received with the previous response. In such case, the DRM broker 138 determines whether the request includes cached data 142, and if so, retrieves the license from the cached data 142, rather than the license server 102. The DRM broker also updates the license state information in the cached data 142. The DRM broker then sends the license and updated cached data 142 to the client device 106 if the entitlement is still active, thereby enabling accessing of the digital media content 158 on the client device 106. The DRM client agent 162 enforces the rules on the client device 106.

Figure 2:
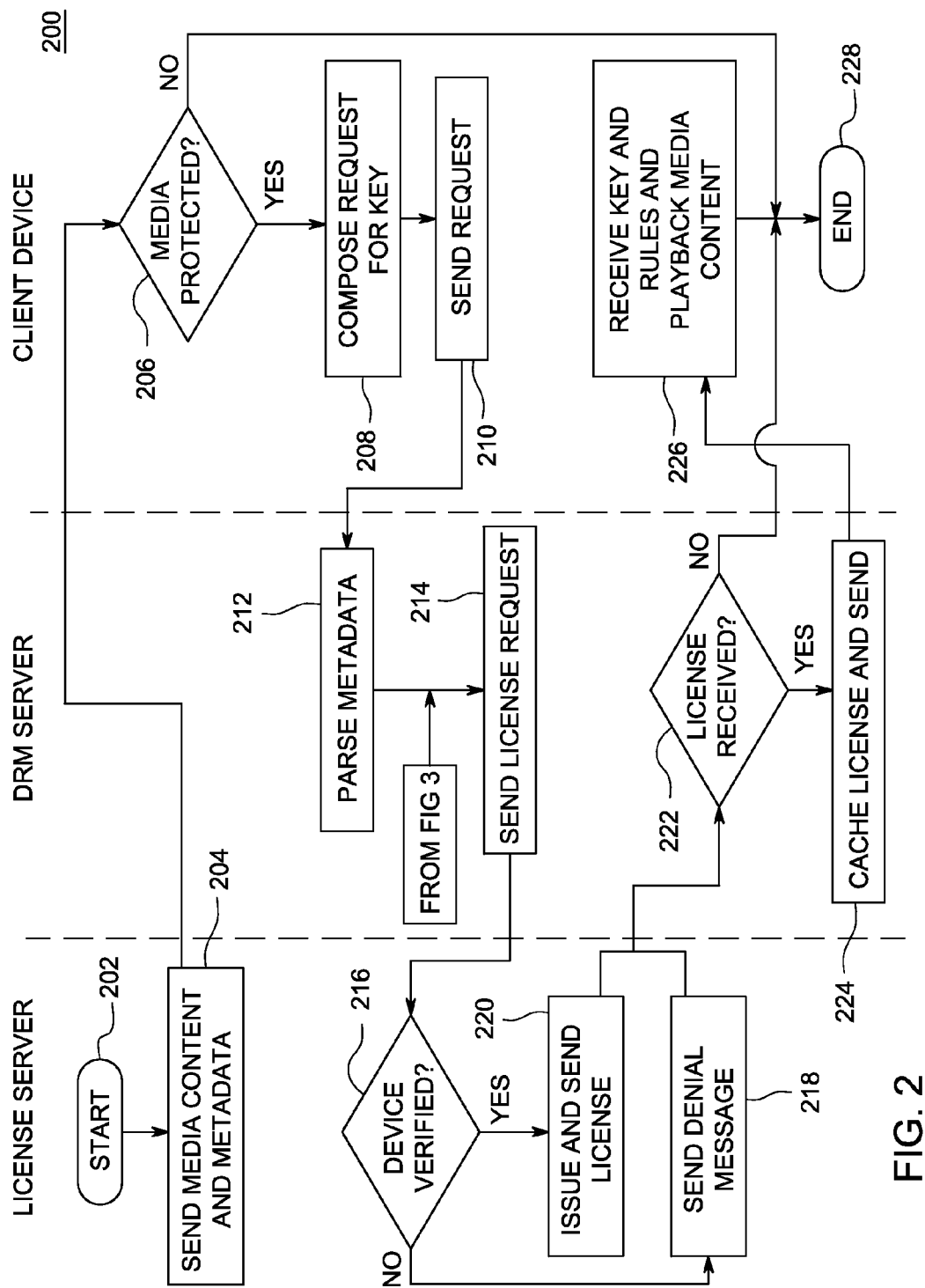
FIG. 2 depicts a flow diagram of a method for providing digital rights management (DRM) service in the cloud as performed by the DRM broker of FIG. 1, according to one or more embodiments.

FIG. 2 depicts a flow diagram of a method 200 for providing digital rights management (DRM) service in the cloud as performed by the DRM broker 138 of FIG. 1, according to one or more embodiments. The method 200 provides a license that enables accessing of digital media content on a device. The method 200 starts at step 202 and proceeds to step 204.

At step 204, upon receipt of a request for digital media content, the method 200 facilitates sending the requested media content and metadata to a client device. The requested digital media content may be protected, meaning its use is limited to client devices that are authorized or otherwise entitled to playback the digital media content. If the digital media content is protected, a key is required to decrypt the digital media content in order to playback the digital media content on a client device. The method 200 proceeds to step 206. At step 206, the method 200 receives the digital media content and metadata and determines whether the digital media content is protected. In a non-limiting example, the digital media content is in the form of a Hypertext Transfer Protocol Live Streaming (HLS) playlist. The method 200 parses the digital media content in order to determine if the digital media content is protected. In the exemplary embodiment, the digital media content may contain HLS tags that identify the digital media content as protected. The HLS tags may include files that can be identified as DRM files. Identification of DRM files in the HLS playlist determine that digital media content is protected.

If the method 200 determines that the digital media content is not protected, the method 200 proceeds to step 228 and ends. However, if at step 206, the method 200 determines that the digital media content is protected, the method 200 proceeds to step 208. At step 208, the method 200 composes a request for a key that enables playback of the protected digital media content. The request includes the metadata for the digital media content as well as client device information. If cached data from a previous key request is available, the cached data is also included in the request. The client device information may be any client device information that identifies the client device to a license server in order for the license server to determine whether the device is entitled to playback the protected digital media content.

The method 200 proceeds to step 210, where the method 200 facilitates sending the request to a DRM broker server. The method 200 proceeds to step 212, where the method 200 parses the metadata that was received in the request. The metadata identifies the digital media content. The metadata also identifies a license server that can verify the client device and provide the key. The digital media content may be received from a digital media provider. The digital media provider may also be the license server and verify the client device or the digital media provider may use a third party license server to verify the client device. In either case, the metadata identifies the license server that can verify the client device and provide a license.

The method 200 proceeds to step 214, where the method 200 composes and facilitates sending a request for a license to the identified license server. The request includes the client device information that was sent from the client device. The method 200 proceeds to step 216, where method 200 determines whether the client device is entitled to view or otherwise access the digital media content. In some embodiments, the method 200 may access billing information to validate the client device is owned by an active customer and ensure the content is on a list of content that the customer who owns the client device is entitled to see. In some embodiments, the method 200 takes the client device information and translates in into a format required by each license server. If the method 200 determines that the client device is not entitled, the method 200 proceeds to step 218, where the method 200 facilitates sending a message denying the request for a license. However, if at step 216, the method 200 verifies that the client device is entitle to view or otherwise access the digital media content, the method 200 issues a license. The license includes a key that can be used to decrypt the protected digital media content as well as rules associated with the digital media content. For example, a rule may be that the digital media content may only be viewed for 48 hours after initiating accessing of the digital media content. The method 200 then facilitates sending the license to the DRM broker server.

The method 200 proceeds to step 222, where the method 200 determines whether a license was received. If the method 200 determines that no license is received and the response from the license server is a message denying the request, the method 200 proceeds to step 228 and ends. However, if the method 200 determines that a license was received, the method 200 proceeds to step 224.

At step 224, the method 200 creates cached data by encrypting the license. The cached data includes the license and license state information pertaining to the execution of the license (e.g., clock time when the license was last requested by the client). The cached data is encrypted, such that only the key is visible to the client device. The method 200 stores the key, cached data, and the rules comprising the license and then facilitates sending the key and rules to the client device.

The method 200 proceeds to step 226, where the method 200 uses the key to decrypt and playback the protected digital media content according to the rules. The method 200 stores the cached data and maps the metadata and the cached data. The method 200 proceeds to step 228 and ends.

Figure 3:
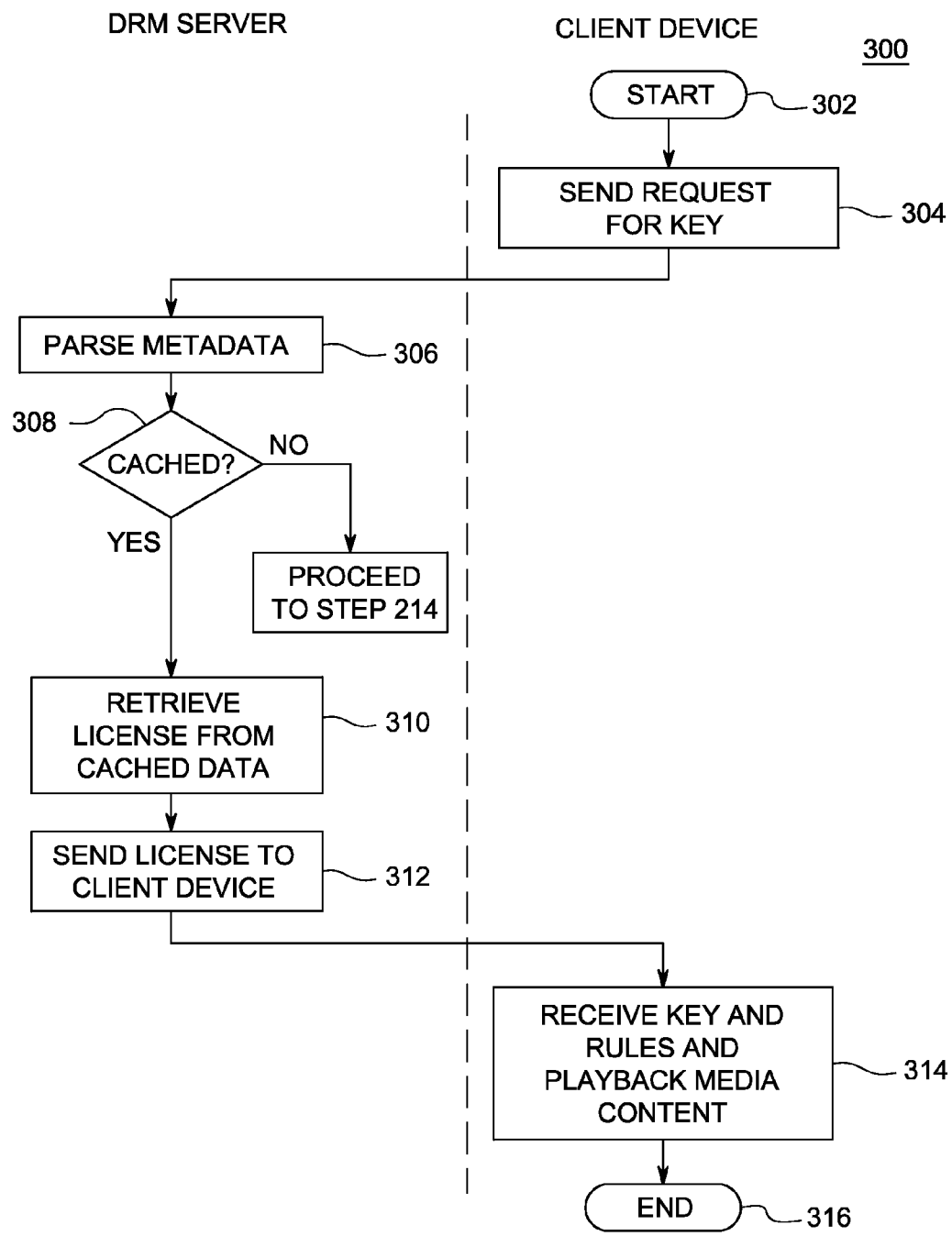
FIG. 3 depicts a flow diagram of a method for receiving a subsequent request from a client device for access to protected digital media content, as performed by the DRM broker of FIG. 1, according to one or more embodiments of the invention.

FIG. 3 depicts a flow diagram of a method 300 for receiving a subsequent request from a client device for access to protected digital media content, as performed by the DRM broker 138 of FIG. 1, according to one or more embodiments of the invention. The method 300 retrieves a license from the cached data that was cached during a previous request for a key, rather than from a license server. The method 300 starts at step 302 and proceeds to step 304.

At step 304, the method 300 composes and facilitates sending a request for the key, as described in steps 208 and 210 above. Because cached data was created and received in a previous request, the request for the key includes the cached data. The method 300 proceeds to step 306, where the method 300 parses the metadata. The metadata identifies the digital media content with which it is associated.

The method 300 proceeds to step 308, where the method 300 determines whether the license is included in the cached data in the request from the client device. The method 300 determines, using the client device information and the metadata whether the license has been stored in a cache as described with respect to step 224 of FIG. 2 above. If the method 300 determines that the license is not in the cached data, the method 300 proceeds to step 309. At step 309, the method 300 proceeds to step 214 of FIG. 2 and proceeds through method 200 to its conclusion. However, if at step 308, the method 300 determines that the license is included in the cached data, the method 300 proceeds to step 310. At step 310 the method 300 decrypts the cached data using the key. The method 300 creates new cached data by encrypting the license and updated license state information using the key and proceeds to step 312. At step 312, the method 300 facilitates sending the key, cached data, and rules retrieved from the cached data to the client device.

The method 300 proceeds to step 314, where the method 300 uses the key to decrypt and playback the protected digital media content according to the rules. Hence, the DRM logic is no longer on the client device, but is placed on a DRM server. There are no longer concerns regarding programming language constraints on certain devices that make the DRM solution less secure. There is no longer the need to scale the DRM logic to low end consumer electronics video consumption devices. Finally, when there is an update to the DRM logic, or when DRM keys are breached, updates to the DRM component may be made on the server without requiring any updates on the client device. Thus, maintaining DRM on the server results in a reduction of time and resources for the digital media provider.

The method 300 proceeds to step 316 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving, at a cloud-based server, a request for a digital rights license associated with a digital media content from a client device, wherein the digital media content has been determined to be protected by the client device and wherein the digital rights license enables accessing of the digital media content on the client device;
determining, by the cloud-based server, an external license server to facilitate processing the request;
routing the request to the external license server;
receiving, at the cloud-based server, a verification that the client device is entitled to access the digital media content and the requested digital rights license from the external license server; and
routing, by the cloud-based server, the requested digital rights license to the client device.

2. The method of claim 1, wherein the request comprises metadata associated with the digital media content and client device information.

3. The method of claim 1, wherein determining comprises:
parsing metadata in order to identify the external license server; and
formatting the request to the identified external license server.

4. The method of claim 1, further comprising creating cached data by encrypting the received digital rights license.

5. The method of claim 4, further comprising:
upon receipt of a subsequent request for the digital rights license from the client device, retrieving the digital rights license by decrypting the cached data; and
routing the digital rights license to the client device.

6. The method of claim 1, wherein the external license server is a digital media content provider.

7. The method of claim 1, wherein the digital rights license comprises a decryption key and at least one rule for the digital media content.

8. An apparatus for providing digital rights management service in the cloud comprising:
a computer having one or more processors;
a non-transitory storage device storing computer readable instructions, that when executed by the one or more processors, cause the apparatus to perform a method comprising:
receiving a request for a digital rights license associated with a digital media content from a client device, wherein the digital media content has been determined to be protected by the client device and wherein the digital rights license enables accessing of the digital media content on the client device;
determining an external license server to facilitate processing the request; routing the request to the external license server;
receiving a verification that the client device is entitled to access the digital media content and the the requested digital rights license from the external license server; and
routing the requested digital rights license to the client device.

9. The apparatus of claim 8, wherein the request comprises metadata associated with the digital media content and client device information.

10. The apparatus of claim 8, wherein the computer readable instructions, when executed by the one or more processors, cause the apparatus to perform the determining by performing steps comprising:
parsing metadata in order to identify the external license server; and
formatting the request to the identified external license server.

11. The apparatus of claim 8, further comprising computer readable instructions, that when executed by the one or more processors, cause the apparatus to perform steps comprising creating cached data by encrypting the digital rights license.

12. The apparatus of claim 11, further comprising computer readable instructions, that when executed by the one or more processors, cause the apparatus to perform steps comprising:
upon receipt of a subsequent request for the digital rights license from the client device, retrieving the digital rights license from the cached data; and
routing the digital rights license to the client device.

13. The apparatus of claim 8, wherein the digital rights license comprises a decryption key and at least one rule for the digital media content.

14. A non-transitory computer readable medium for storing computer instructions that, when executed by a cloud-based server causes the a cloud-based server to perform a method for providing digital rights management service in the cloud comprising:
receiving, at the cloud-based server, a request for a digital rights license associated with a digital media content from a client device, wherein the digital media content has been determined to be protected by the client device and wherein the digital rights license enables accessing of the digital media content on the client device;
determining, by the cloud-based server, an external license server to facilitate processing the request;
routing the request to the external license server;
receiving, at the cloud-based server, a verification that the client device is entitled to access the digital media content and the requested digital rights license from the external license server; and
routing, by the cloud-based server, the requested digital rights license to the client device.

15. The computer readable medium of claim 14, wherein the request comprises metadata associated with the digital media content and client device information.

16. The computer readable medium of claim 14, wherein determining comprises:
parsing metadata in order to identify the external license server; and
formatting the request to the identified external license server.

17. The computer readable medium of claim 14, further comprising creating cached data by encrypting the received digital rights license.

18. The computer readable medium of claim 17, further comprising:
upon receipt of a subsequent request for the digital rights license from the client device, retrieving the digital rights license by decrypting the cached data; and
routing the digital rights license to the client device.

19. The computer readable medium of claim 14, wherein the external license server is a digital media content provider.

20. The computer readable medium of claim 14, wherein the digital rights license comprises a decryption key and at least one rule for the digital media content.

\* \* \* \* \*